(12) United States Patent
Hühn et al.

(10) Patent No.: US 6,343,888 B1
(45) Date of Patent: Feb. 5, 2002

(54) METHOD FOR THE PRODUCTION OF A BALL JOINTED CONNECTION

(75) Inventors: Bernd Hühn, Elchingen; Manfred Lotter, Neu-Ulm; Thomas Kunze, Roggenburg; Rainer Stölzer, Neu-Ulm, all of (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 09/380,439
(22) PCT Filed: Mar. 23, 1998
(86) PCT No.: PCT/EP98/01687
  § 371 Date: Sep. 1, 1999
  § 102(e) Date: Sep. 1, 1999
(87) PCT Pub. No.: WO98/42949
  PCT Pub. Date: Oct. 1, 1998

(30) Foreign Application Priority Data

Mar. 26, 1997 (DE) .......................................... 197 12 838
Apr. 22, 1997 (DE) .......................................... 197 16 880

(51) Int. Cl.⁷ .............................. F16C 11/00; F16D 1/12
(52) U.S. Cl. ...................... 403/133; 403/274; 403/280; 403/122
(58) Field of Search ........................ 403/133, 274–277, 403/278, 280, 122, 132, 135

(56) References Cited

U.S. PATENT DOCUMENTS

| | | | | |
|---|---|---|---|---|
| 3,802,232 A | | 4/1974 | Suechting ..................... 92/140 |
| 4,905,577 A | * | 3/1990 | Schneeweis .................. 92/158 |
| 5,072,655 A | * | 12/1991 | Adler ........................... 92/160 |
| 5,114,261 A | * | 5/1992 | Sugimoto et al. ............ 403/122 |
| 5,114,263 A | * | 5/1992 | Kanamaru et al. .......... 403/274 |
| 5,253,947 A | * | 10/1993 | Petrzelka et al. ............ 403/274 |
| 5,392,693 A | * | 2/1995 | Engel et al. ................... 92/248 |
| 5,490,446 A | * | 2/1996 | Engel ........................... 92/157 |
| 5,702,660 A | * | 12/1997 | Allot et al. ................... 264/242 |
| 5,724,733 A | * | 3/1998 | Engel et al. ............. 29/888.02 |
| 5,758,566 A | * | 6/1998 | Jepsen et al. ................. 92/187 |

FOREIGN PATENT DOCUMENTS

| | | |
|---|---|---|
| DE | 21 32 252 | 2/1972 |
| DE | 17 76 027 | 3/1972 |
| DE | 20 43 654 | 3/1972 |
| DE | 34 06 782 A1 | 8/1984 |
| DE | 31 32 824 C2 | 10/1986 |
| DE | 42 14 765 A1 | 11/1993 |
| EP | 0 371 834 A1 | 10/1989 |
| JP | 62-218664 | 3/1986 |

* cited by examiner

Primary Examiner—Lynne H. Browne
Assistant Examiner—John B. Walsh
(74) Attorney, Agent, or Firm—Scully, Scott, Murphy & Presser (57) ABSTRACT

The invention relates to a method for the production of a ball jointed connection between a guide shoe (10) and a cylinder piston (1) of a piston machine. A spherical cap-shaped recess (2) is first of all formed on the cylinder piston (1) and/or the guide shoe (10), whereby the recess (2) is undercut in such a way that the spherical cap-shaped recess (2) comprises a solid angle area ($\alpha$) of over 180°, and the diameter (D) in the region of the equator plane (5) is greater than the diameter (d) of the recess (2). Furthermore, a spherical head (11) is formed on the corresponding counterpart, that is the guide shoe (10) and/or the cylinder piston (1). In accordance with a first version of the invention, the spherical head (11) is pushed into the spherical cap-shaped recess (2) in such a way that the edge area (6) surrounding the spherical cap-shaped recess (2) is elastically deformed when the spherical head (11) is pushed in, and the surrounding edge area (6) grips behind the spherical head (11). Alternatively, the spherical head (11) has a flattening (20) which is plastically deformed after introduction of the spherical head (11) into the recess (2).

13 Claims, 6 Drawing Sheets

METHOD FOR THE PRODUCTION OF A BALL JOINTED CONNECTION

The invention relates to a process for the production of a ball joint connection between a sliding shoe and a cylinder piston of a piston engine, particularly an axial piston engine.

In axial piston engines of swash plate construction, the cylinder pistons which are movable in cylinder bores are supported on the sliding surface of a swash plate via a sliding shoe in each case. It is conventional to connect the cylinder pistons to the sliding shoes by means of a ball joint connection so as to ensure a flat seating of the sliding sole of the sliding shoes on the sliding surface of the swash plate in every inclined position of the swash plate.

When producing a ball joint connection it is generally conventional to insert the ball head formed on the sliding shoe or the cylinder piston into a rounded-off recess of the corresponding counter-piece, i.e. the cylinder piston and/or sliding shoe. The recess is rounded off as a hollow hemisphere only in a solid angle region of approx. 180°. A region in the shape of a hollow cylinder which ends at an opening adjoins this hemispherical region of the recess. The opening diameter at the opening of the recess corresponds to the diameter in the region of the equator plane of the semi-hollow ball-shaped region of the recess. When the sliding shoe and the cylinder piston are joined the ball head formed on one of the two components is introduced into the recess and anchored positively in the recess. This is necessary so that a corresponding tensile force is transferable via the ball joint connection during the suction stroke of the piston engine.

In a current process for connecting the ball head to the corresponding recess, the edge region surrounding the ball head in the region of the opening of the recess is beaded, e.g. by means of rolling, after the spherical ball head has been inserted. A process of this kind emerges from DE-OS 1 776 027 for example. In contrast it is known from DE-AS 21 32 252 that, in order to anchor the ball head of the sliding shoe in the recess of the cylinder piston, a locking ring is used which is supported against an inner surface of the recess. The above two processes are relatively complex and mass production is associated with relatively high production and assembly costs.

The plastic deformation of the cylinder piston in the edge region surrounding the dome-shaped recess is associated with drawbacks in that the piston is subjected to a special hardening, by nitriding and a heat treatment for example, in order to improve wear resistance. This hardening does, however, conflict with a subsequent plastic deformation so that the region surrounding the dome-shaped recess must be omitted from the heat treatment, which signifies considerable additional outlay. There is also the problem that the high compressive force required to deform the cylinder piston generally made of steel leads to an undesired co-deformation of the ball head of the sliding shoe which is made of a copper or bronze alloy to improve the sliding properties. In practice it is therefore necessary to design the sliding shoe in two parts with a sliding part made of a copper or bronze alloy and a steel ball inserted into it.

In any event an additional, complex working step is required for the beading. The insertion of a locking ring to lock the ball head increases the number of parts required for assembly and has not proved successful in practice because of the high assembly and production outlay.

From DE 42 14 765 A1 it is known to provide the ball head of the sliding shoes with a flattening which is angled off in respect of the longitudinal axis of the sliding shoes. After insertion of the ball head into the recess of the cylinder piston it is possible to tilt the ball head in the recess in such a way that it cannot be pulled out of the recess. This process does, however, have the disadvantage that the interface between the ball head of the sliding shoe and the recess of the cylinder piston in the region of the edges of the ball head is subject to increased wear. Furthermore, the bearing surface is considerably reduced by the flattening. In addition the swivel angle which the swash plate may assume with respect to the cylinder drum is considerably restricted. This process cannot be used in particular for axial piston engines with swash plates which can swivel in both swivel directions.

The object of the invention is therefore to provide a process for the production of a ball joint connection between a sliding shoe and a cylinder piston which permits efficient and economical mass production.

The object is achieved by both the features of claim 1 and the features of claim 4 or 12.

The solution according to Claim 1 is based on the finding that an economical joining of the ball joint may be achieved in that the edge region surrounding the recess is elastically deformed on joining and the ball head is pressed into the recess after the fashion of a snap-fastener.

Claims 2 and 3 relate to advantageous developments of the solution according to claim 1.

According to claim 2 it is advantageous that the elastic stress distribution on pressing the ball head into the dome-shaped recess is radially distributed as uniformly as possible. According to claim 3 the pressing of the ball head into the recess may be facilitated in that a liquid or gaseous pressure medium is applied to the recess via a bore provided in the sliding shoe or the cylinder piston. An elastic expansion of the edge region of the recess is achieved in this way. According to claim 1 the elastic deformation of the edge region surrounding the recess may also be promoted in that radial slits are provided in the edge region.

The solution according to claim 4 is based on the finding that the ball joint connection may also be produced simply and inexpensively in that the ball head is first formed with a flattening, in order to introduce the ball head into the undercut recess. After the ball head has been inserted it is plastically deformed. Unlike the beading known from the prior art, it is advantageous in this case when the ball head consists of a readily deformable material, e.g. a copper or bronze alloy, which is conventionally used to form the sliding shoes. It is also advantageous when the recess forming the die is made of a hardened material such as is conventionally used for cylinder pistons. A plastic deformation of the ball head is thus more satisfactorily suited to the given material properties than the beading of the edge region of the recess known from the prior art.

Claims 5 to 11 relate to advantageous developments of the solution according to claim 5.

According to claim 9 a longitudinal bore, to which a liquid or gaseous pressure medium is applied for the plastic deformation of the ball head, in order radially to displace the material of the ball head, may pass through the ball head.

Alternatively, however, the material may also be displaced by means of a caulking mandrel inserted into the longitudinal bore according to claim 10. In this case it is advantageous when according to claim 11 the longitudinal bore has an internal projection which may be co-formed when the ball head is deformed according to the development according to claim 8.

The solution according to claim 12 is based on the finding that an economical joining of the ball joint may be achieved in that the edge region surrounding the recess and/or the ball head is thermally deformed prior to joining, the ball head is inserted into the recess and the desired engaging connection is produced by means of temperature adjustment of the ball head and the edge region surrounding the recess.

Claim 13 relates to an advantageous development of the invention. The thermal deformation may be combined with an elastic deformation.

Figure 1A:
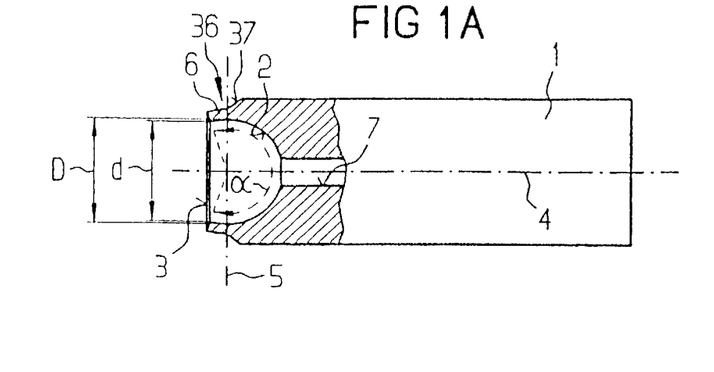
FIG. 1A shows a cylinder piston prepared for the implementation of the process according to the invention, according to a first embodiment.

Embodiments of the invention will be described in greater detail below with reference to the drawings in which:

FIG. 1A shows a cylinder piston 1 prepared for the implementation of the process according to the invention. The cylinder piston 1 is movable in per se known manner in a cylinder bore of the piston engine which is arranged in a rotating cylinder drum for example in an axial piston engine of swash plate construction.

At one of its ends the cylinder piston 1 has a spherical, dome-shaped and/or partially spherical recess 2. The dome-shaped recess 2 is opened at an opening 3 on the front face of the cylinder piston 1. In a manner essential to the invention the recess 2 is undercut in such a way that the dome-shaped recess 2 comprises a solid angle region of more than 180° ($\alpha > 180°$). In other words, the diameter d of the opening 3 is smaller than the diameter D of the recess 2 in the region of the equator plane 5 extending perpendicular to the longitudinal axis 4. To illustrate this the opening diameter d and the diameter D of the recess 2 in the region of the equator plane 5 are marked in FIG. 1A. The dome-shaped recess 2 has an elastically deformable edge region 6 between the equator plane 5 and the opening 3. The cylinder piston 1 may be homogeneously made of an elastic material which is difficult to deform, particularly by means of a heat treatment, of nitrided steel. In contrast to the beading process known from the prior art, in the process according to the invention it is not a matter of the plastic deformability of the edge region 6. On nitriding, therefore, the cylinder piston 1 may be subjected to a homogeneous, uniform heat treatment without the edge region 6 of the recess 2 having to be exempted from this treatment and without the need for the additional outlay this would require.

In per se known manner the dome-shaped recess 2 is connected to the cylinder bore of the piston engine which is not shown via a longitudinal bore 7 in order to permit a pressure medium flow to the sliding sole of the sliding shoe via a longitudinal bore also provided in the associated sliding shoe and thus to effect a lubricating effect and a hydraulic relief.

Figure 1B:
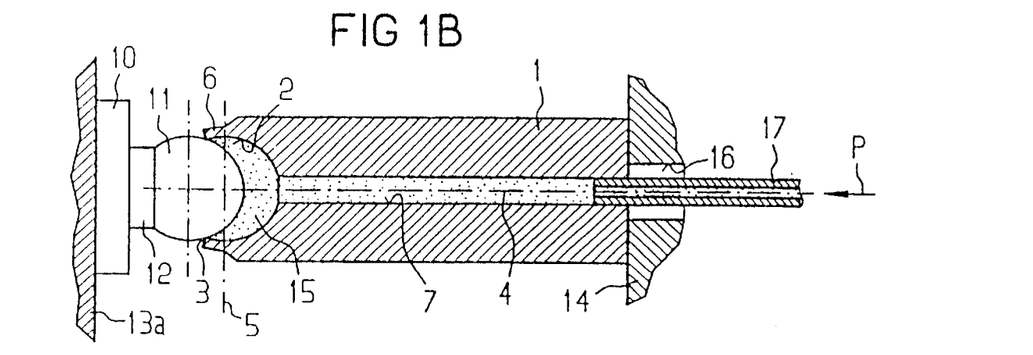
FIG. 1B shows the joining of ball head and dome-shaped recess with the aid of a pressure medium.

FIG. 1B shows the process step in which the ball head 11 formed on the sliding shoe 10 via a collar section 12 is pressed in. The ball head 11 is spherically shaped in the form of a partial sphere, the diameter of the ball head 11, apart from a slight bearing clearance, coinciding with the equatorial diameter D of the dome-shaped recess 2.

Figure 1C:
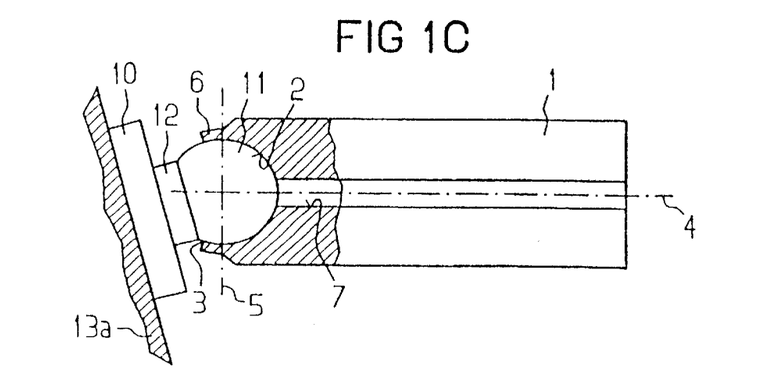
FIG. 1C shows the finished ball joint connection with a ball head on the sliding shoe side which engages in a recess on the cylinder piston side.

To press the ball head 11 into the dome-shaped recess 2 of the cylinder piston 1 the arrangement consisting of the sliding shoe 10 and the cylinder piston 1 is clamped between two jaws 13 and 14 which are moved towards each other when the ball head 11 is pressed into the dome-shaped recess 2. The sliding shoe 10 rests on the first jaw 13 and the cylinder piston 1 on the second jaw 14. While the ball head 11 is being pressed into the dome-shaped recess 2 the edge region 6 surrounding the dome-shaped recess 2 in the region between the opening 3 and the equator plane 5 is elastically deformed and/or expanded so that the edge region 6 engages the ball head 11. The finished assembly state is shown in FIG. 1C.

To facilitate the expansion of the edge region 6 surrounding the dome-shaped recess 2 a liquid or gaseous pressure medium 15 may be applied to the dome-shaped recess 2. This measure is, however, only an optional development of the invention. For this purpose a pipe 17 is inserted into the longitudinal bore 7 of the cylinder piston 1 via a bore 16 in the second jaw 14. The liquid or gaseous pressure medium 15, e.g. a hydraulic oil or compressed air, is supplied to the dome-shaped recess 2 via the pipe 17 and the longitudinal bore 7 in order to faciliate the expansion of the edge region 6. Similarly it is also possible to feed the pressure medium to the dome-shaped recess 2 via a bore (not shown) in the sliding shoe 10.

Figure 2:
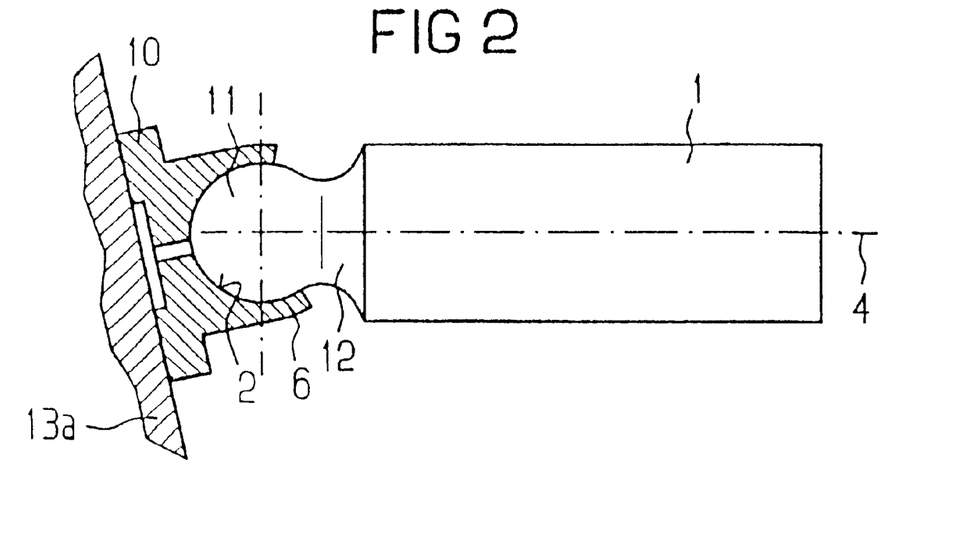
FIG. 2 shows a finished ball joint connection with a ball head on the cylinder piston side which engages in a recess on the sliding shoe side.

FIG. 2 shows an embodiment of a reversed ball joint connection, the ball head 11 being formed on the cylinder piston 1 via a neck section 12 and the dome-shaped spherical recess 2 being provided on the sliding shoe 10. The process according to the invention is equally suitable for a ball joint connection designed in this way, the edge region 6 surrounding the spherical recess 2 being elastically deformed in this case also when the ball head 11 is pressed in and/or inserted.

Figure 3:
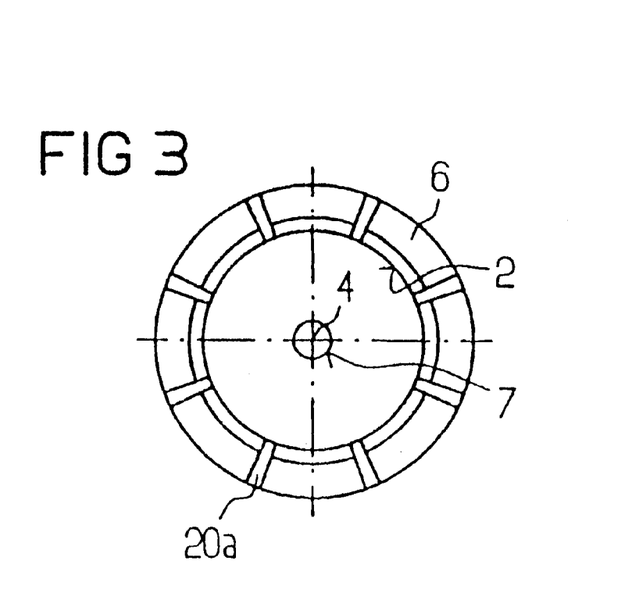
FIG. 3 shows a view of the cylinder piston shown in FIG. 1A in axial direction with a development according to the invention.

FIG. 3 shows a view of the spherical recess 2 provided on the cylinder piston 1 along the longitudinal axis 4. The edge region 6 surrounding the spherical recess 2 and the longitudinal bore 7 can be seen. According to a development of the invention which can be seen in FIG. 3, the edge region 6 surrounding the dome-shaped recess 2 is provided with uniformly distributed radial slits 20a. The slits 20a serve to facilitate the elastic expansion of the edge region 6. In no way, however, are the slits 20a absolutely essential. 13a denotes a swash plate on which the sliding shoe 10 is supported.

Figure 4A:
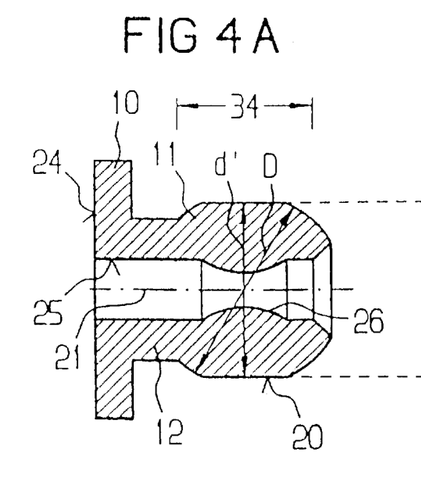
FIG. 4A shows a sliding shoe prepared for the process according to the invention according to a second embodiment.
Figure 4B:
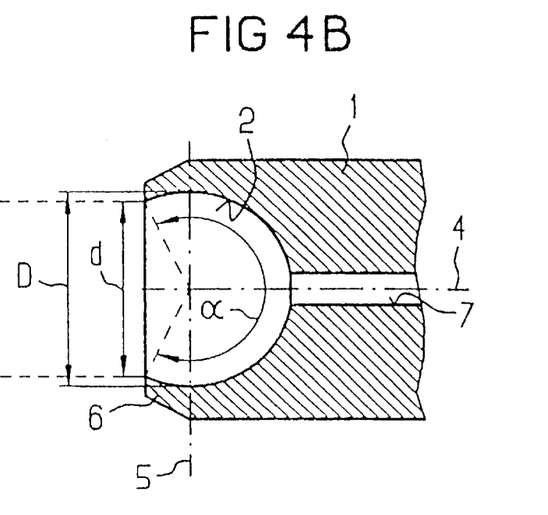
FIG. 4B shows a cylinder piston prepared for the process according to the invention according to the second embodiment.
Figure 4C:
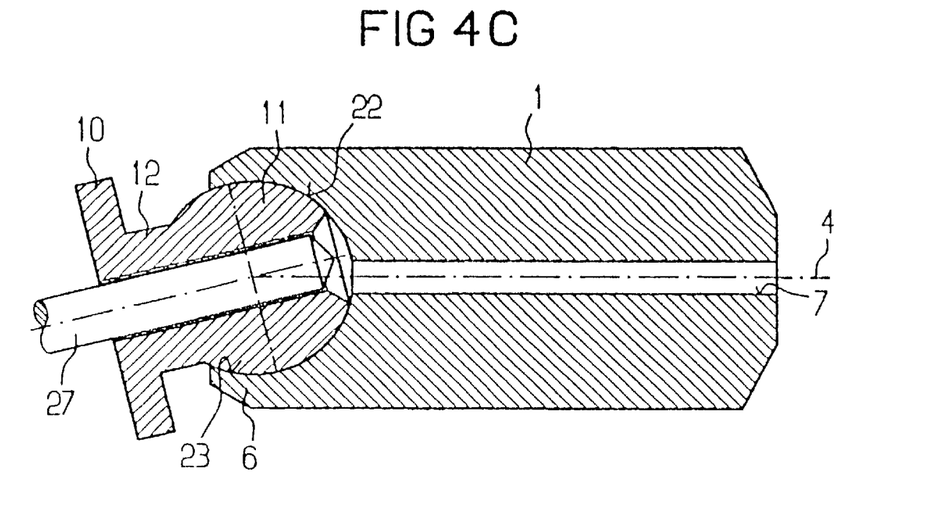
FIG. 4C shows the connection of the sliding shoe shown in FIG. 4A to the cylinder piston shown in FIG. 4B.
Figure 4D:
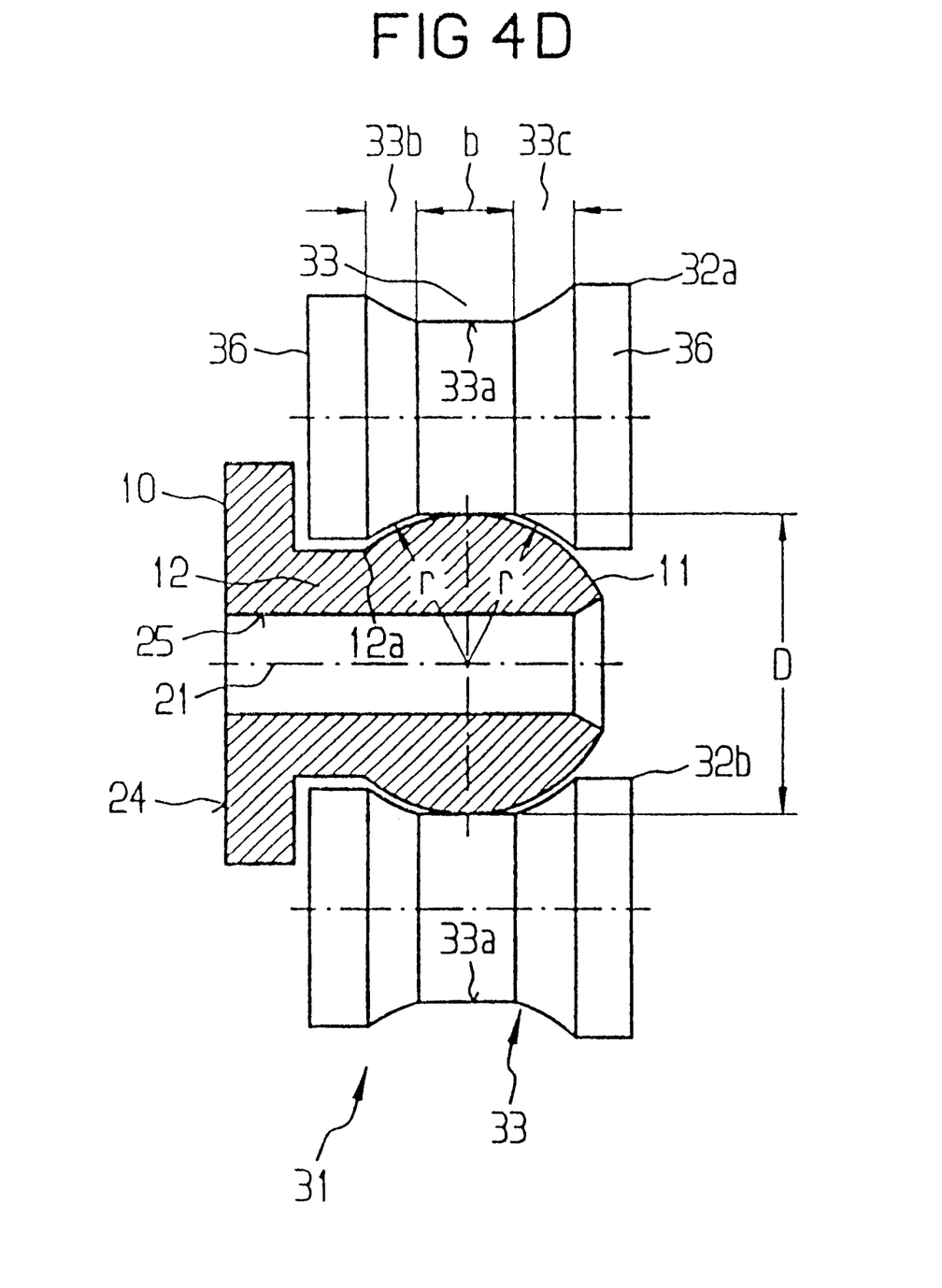
FIG. 4D shows a prefabricated sliding shoe with a roll device for forming the sliding shoe into a form corresponding to FIG. 4A.
Figure 5A:
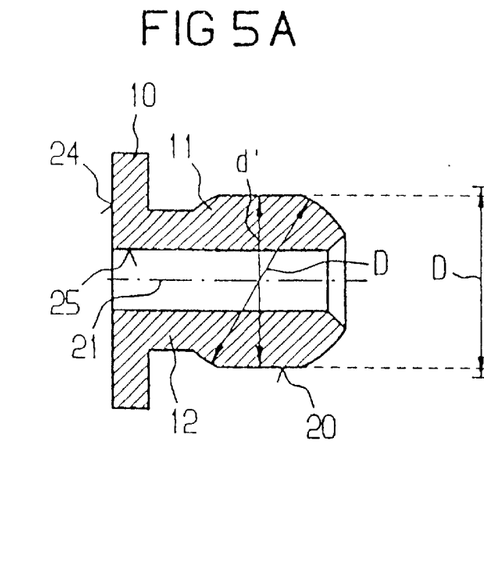
FIG. 5A shows a sliding shoe prepared for the process according to the invention according to a third embodiment.
Figure 5B:
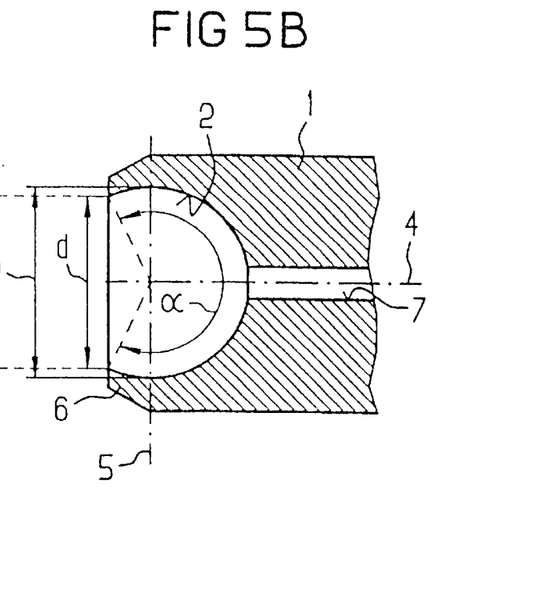
FIG. 5B shows a cylinder piston prepared for the process according to the invention according to the third embodiment.
Figure 5C:
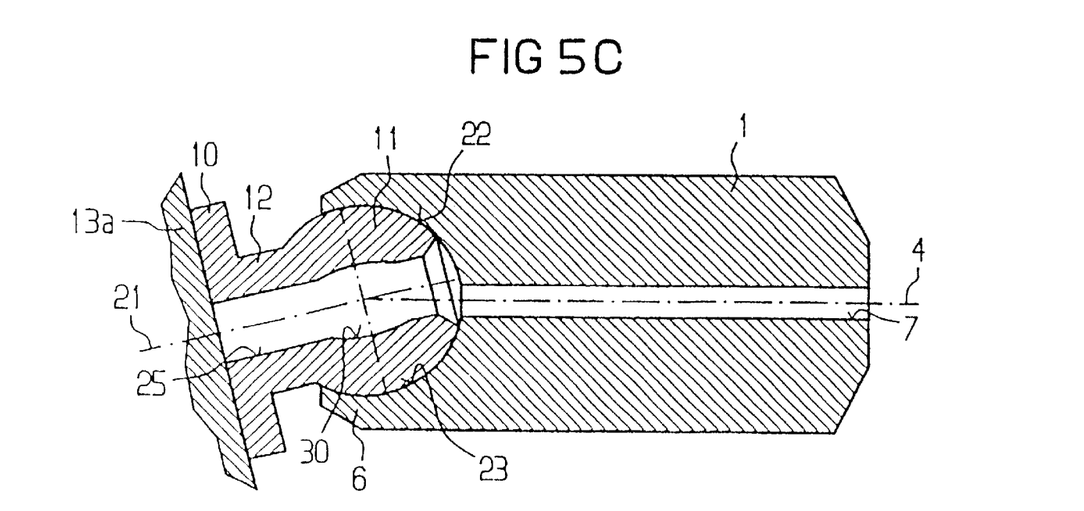
FIG. 5C shows the connection of the sliding shoe shown in FIG. 5A to the cylinder piston shown in FIG. 5B.

FIGS. 4A to 4C and 4D on the one hand and FIGS. 5A to 5C on the other hand show two embodiments of the process according to the invention which is based on a modified idea. Reference numerals which coincide with FIGS. 1A to 1C are used as far as possible.

As can be seen from FIGS. 4B and 5B the cylinder piston 1 is designed in the same way as in FIG. 1A. The spherical, dome-shaped recess 2 is undercut in this embodiment also, so that the dome-shaped recess 2 comprises a solid angle region α of more than 180° (α>180°). The diameter D in the region of the equator plane 5 is thus larger in size than the opening diameter d of the recess 2. On the side of the cylinder piston 1 there is therefore no substantial difference from the embodiment already described with the aid of FIGS. 1A to 1C irrespective of the yield point of the material, so that a larger solid angle α and/or smaller opening diameter d is achievable.

The ball head 11 formed on the sliding shoe 10 shown in FIGS. 4A, 4D and 5A does, however, have a flattening 20 running round the longitudinal axis 21 of the sliding shoe 10, the diameter d' of which either approximately coincides with the opening diameter d of the recess 2 or is smaller in size than the opening diameter d. The ball head 11 can therefore be inserted into the recess 2 without more ado. After the ball head 11 is inserted into the recess 2 it is plastically deformed in such a way that the flattening 20 is eliminated and the external surface 22 of the ball head 11, which can be seen in FIGS. 4C and 5C, is adapted to the spherical inner surface 23 of the dome-shaped recess 2. FIGS. 4C and 5C show the completely formed final state of the ball head 11 inserted into the recess 2.

In the embodiments shown in FIGS. 4A to 4C and 4D, a longitudinal bore 25 required in any case to feed the pressure medium to the sliding sole 24 of the sliding shoe 10 has a narrowing in the form of an internal projection 26. By inserting a caulking mandrel 27 shown in FIG. 4C into the longitudinal bore 25 of the sliding shoe 10, the material of the ball head 11 is displaced radially outwards until the flattening 20 is eliminated and the external surface 22 of the ball head 11 is adapted to the inner surface 23 of the dome-shaped recess 2. In this case the material of the ball head 11 is preferably a softer, more readily deformable material than the material of the edge region 6 surrounding the recess 2. The edge region 6 of the cylinder piston 1 surrounding the recess 2 acts as a die for the deformation of the ball head 11. As already described above, because of the sliding properties to be required, the sliding shoe consists in any case of a softer and more deformable material, e.g. a copper or bronze alloy, than the cylinder piston 1 consisting of a hardened, e.g. nitrided, steel. The deformation of the ball head 11 is therefore substantially better adapted to the given material conditions than the plastic deformation of the edge region 6 surrounding the dome-shaped recess 2 which is known from the prior art, e.g. in the form of a beading.

The purpose of the roll device denoted generally by 31 in FIG. 4D is to form the flattening 20 on the previously round ball head 11 in a cold and non-cutting manner, namely by rolling with the roll device 31 which has at least two rolls 32a, 32b which are diametrically opposite each other with respect to the ball head 11, are preferably identical in design and have on their lateral surface an annular recess 33 in each case, the concave shape of which corresponds in reverse to the convex shape of the ball zone denoted by 34 in FIG. 4A. The rolls 32a, 32b thus each have a cylindrical lateral surface 33a, the width b of which corresponds to the width of the flattening 20. This cylindrical lateral surface part 33a is adjoined, axially and in mirror image to each other, by two lateral surface parts 33b, 33c which are curved divergently and in the shape of a section of an arc of a circle, as rotation surfaces of the associated roll, the radius r of which corresponds to the radius of the ball head 11 and the width of which is dimensioned in such a way that when the ball head 11 is formed the ball shape near the rolls 32a, 32b does not deform because of the counterpressure applied by the lateral surface parts and is thus retained. In this embodiment the lateral surface part 33c facing the ridge of the ball head extends over an angle range of approx. 5 to 10° or as far as the vicinity of the edge of the longitudinal bore 25. The lateral surface part 33b facing the collar section 12 extends as far as the vicinity of or as far as the transitional edge 12a between the collar section 12 and the ball surface. Axially cylindrical lateral surface parts 36 with a width of a couple of millimetres adjoin the lateral surface parts 33b, 33c.

The rolls 32a, 32b are adjustable with respect to their axial spacing by means of a mechanism which is not shown and a drive which is not shown is also provided which generates a relative movement between the ball head 11 and/or sliding shoe 10 on the one hand and the rolls 32a, 32b on the other hand. By this means it is possible to rotate the ball head 11 and/or sliding shoe 10 or the rolls 32a, 32b as a unit about the longitudinal axis 21. In the roll process which takes place in this way the axial spacing between the rolls 32a, 32b is reduced by an adjustment device, which is also not shown, until the desired flattened form of the ball head is achieved between them. The inner projection 26 (see FIG. 4A) is rendered convex at the same time by the material deformation. The roll process described above is comparable to a rolling process and may therefore also be designated as a rolling process. This also applies to the rolls 32a, 32b, which may be designated as rolls and/or section rolls. In the context of the invention it is also possible to produce the projection 26 in another way.

The forming and/or back-forming of the ball head according to FIG. 4D to eliminate the flattening 20 takes place in corresponding manner, as has already been described with the aid of FIG. 4C. In the context of the invention it is also possible to form and/or back-form a ball head 11 arranged on the cylinder piston 1 correspondingly.

FIGS. 5A to 5C show a further embodiment of the process according to the invention. In contrast to the ball head 11 shown in FIG. 4A the ball head 11 shown in FIG. 5A does not have the inner projection 26. In corresponding manner the longitudinal bore 25 of the sliding shoe 10 has a corresponding radial enlargement 30 after the deformation shown in FIG. 5C. In this embodiment the deformation may be achieved by means of an expanding mandrel which is not shown or by means of a gaseous, preferably liquid pressure medium which is applied to the longitudinal bore 25 of the sliding shoe 10 of the ball head 11. The radial deformation may, however, also be achieved by means of an axial upsetting process of the ball head 11.

Figure 6:
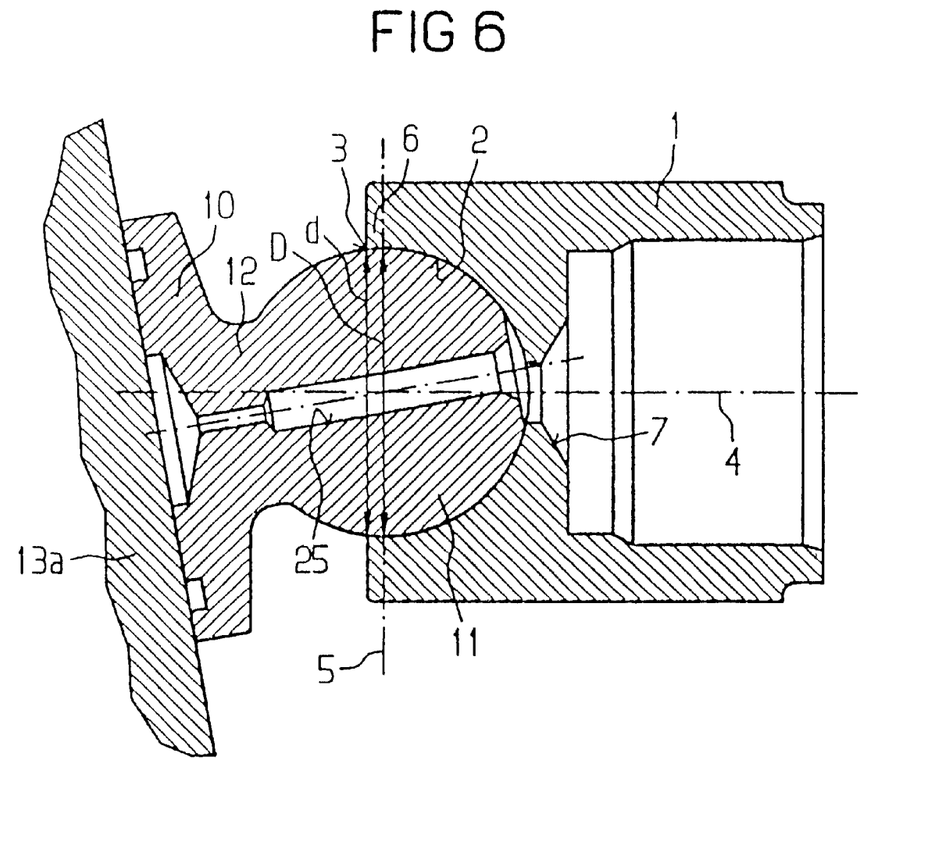
FIG. 6 shows a finished ball joint connection with a ball head on the sliding shoe side which engages in a recess on the cylinder piston side, according to a fourth embodiment.

The joint connection of the fourth embodiment according to FIG. 6, in which identical or comparable parts are provided with the same reference numerals, may be designed according to the form of the first embodiment according to FIGS. 1A to 1C. This joint connection is produced by the following process.

The cylinder piston 1 is heated before the ball head 11 is inserted into the dome-shaped recess 2 of the cylinder piston 1. Heating in the region of the edge region 6 surrounding the dome-shaped recess 2 may be sufficient, although the cylinder piston 1 may also be homogenously, uniformly heated. The ball head 11 is cooled alternatively or additionally. This may take place, for example, by immersion in a suitable coolant, such as liquid nitrogen. While the edge region 6 of the dome-shaped recess 2 expands because of the heating and the opening diameter d thus expands, the ball head 11 contracts correspondingly on cooling so that the ball head diameter reduces correspondingly. In this way it is possible to insert the ball head 11 into the dome-shaped recess 2 virtually without resistance. When the temperatures of the edge region 6 of the dome-shaped recess 2 of the ball head 11 have adjusted to one another again, the ball head 11 is anchored in the dome-shaped recess 2 in that the edge region 6 engages the ball head 11.

The processes according to FIGS. 4A to 4D and according to FIGS. 5A to 5C may, of course, also readily be combined with each other and/or with the elastic deformations described with the aid of FIGS. 1 to 3 and/or FIG. 6. The latter, should thermal deformation not suffice. Compared with the case in which a heat treatment of the ball head 11 and of the edge region 6 of the dome-shaped recess 2 is dispensed with, however, the elastic deformation is substantially less, so that comparatively lower demands should be made of the elastic properties of the material of the cylinder piston 1. The process may, of course, also be similarly applied when the ball head 11 is formed on the cylinder piston 1 and the spherical, dome-shaped recess 2 on the sliding shoe 10. In particular the process according to the invention is preferably applicable when the cylinder piston 1 consists of steel and the sliding shoe 10 of a non-ferrous alloy.

A particular advantage of the heat treatment of the edge region 6 of the spherical, dome-shaped recess 2 and/or of the ball head 11 is the lack of dependence on the wall thickness of the edge region 6. In contrast, the wall thickness of the edge region 6 is of not insubstantial importance in the case of an elastic deformation. Furthermore, a structural change, a material deformation or an expansion loss, due to a plastic partial deformation, such as are conceivable in principle in the process by means of elastic deformation, are avoided.

A difference between the joint connection according to FIGS. 1A to 1C on the one hand and the joint connection according to FIG. 6 on the other hand may consist of the fact that the embodiment of FIG. 6 requires no tapering of the edge region 6, which in the first embodiment is formed by an annular groove 37 on the associated end of the cylinder piston 1, which groove tapers the edge region 6, and is denoted by 36. In the first embodiment this tapering 36 may be required if the edge region 6 has a radial thickness which renders its expansion difficult in the process according to the first embodiment for reasons of excessive strength. In the embodiment according to FIG. 6 such a tapering is not required since because of the heating a radially thick edge region 6 also participates without problems in the expansion on heating and on contraction when cooling.

The invention is not restricted to the embodiments illustrated. A multiplicity of further possibilities for either the elastic deformation of the edge region 6 surrounding the dome-shaped recess 2 or the plastic deformation of the ball head 11 is conceivable.

What is claimed is:

1. Process for the production of a ball joint connection between a sliding shoe (10) and a cylinder piston (1) of a piston engine with the following process steps:

forming a spherical, dome-shaped recess (2) on the cylinder piston (1), or on the sliding shoe (10), and optionally forming the spherical dome shaped recess (2) on both the cylinder piston (1) and the sliding shoe (10), wherein the dome shaped recess (2) is undercut in such a way that the dome-shaped recess (2) comprises a solid angle region (a) of more than 180° and the diameter (D) in the region of the equator plane (5) of the dome-shaped recess (2) is greater than the opening diameter (d) of the dome-shaped recess (2), forming a spherical ball head (11) on the sliding shoe (10), or on the cylinder piston (1), and optionally forming the spherical ball head (11) on both the sliding shoe (10) and the cylinder piston (1), and pressing the ball head (11) into the dome-shaped recess (2), wherein an edge region (6) surrounding the dome-shaped recess (2) is elastically deformed when the ball head (11) is pressed in and engages the domed shaped recess (2), wherein the edge region (6) surrounding the dome-shaped recess (2) is provided with radial slits (20a) to facilitate the elastic deformation.

2. Process according to claim 1, characterized in that when the ball head (11) is pressed in, a radially uniform, elastic stress distribution prevails in the edge region (6) surrounding the dome-shaped recess (2).

3. Process according to claim 1, characterized in that when the ball head (11) is pressed in an expansion of the edge region (6) surrounding the dome-shaped recess (2) is supported by a liquid or gaseous pressure medium (15) which is supplied to the dome-shaped recess (2) via a bore (7) in the cylinder piston (1) or the sliding shoe (10) and to which a pressure (p) is applied.

4. Process for the production of a ball joint connection between a sliding shoe (10) and a cylinder piston (1) of a piston engine with the following process steps:

forming a spherical, dome-shaped recess (2) on the cylinder piston (1), or on the sliding shoe (10), and optionally forming the spherical dome shaped recess (2) on both the cylinder piston and the sliding shoe, wherein the dome shaped recess (2) is undercut in such a way that the dome-shaped recess (2) comprises a solid angle region (a) of more than 180° and the diameter (D) in the region of the equator plane (5) of the dome-shaped recess (2) is greater than the opening diameter (d) of the dome-shaped recess (2), pre-forming a spherical ball head (11) on the sliding shoe (10), or on the cylinder piston (1), and optionally pre-forming the spherical ball head (11) on both the sliding shoe (10) and the cylinder piston (1), so that the ball head (11) has a flattening (20) parallel to its longitudinal axis (21) and the diameter (d') in the region of the flattening (20) is smaller than or approximately equal to the opening diameter (d) of the dome-shaped recess (2), inserting the ball head into the dome-shaped recess (2), and plastically deforming the ball head (11) until the flattening (20) of the ball head (11) is eliminated and the external surface (22) of the ball head (11) is adapted to the spherical inner surface (23) of the dome-shaped recess (2).

5. Process according to claim 4, characterized in that the ball head (11) is plastically deformed by an axial upsetting of the ball head (11).

6. Process according to claim 4, characterized in that the pre-forming of the ball head (11) to form the flattening (20) is performed in a non-cutting or cold manner.

7. Process according to claim 4, characterized in that the flattening (20) of the ball head (11) is formed by rolling.

8. Process according to claim 6, characterized in that an internal projection (26) is formed in a longitudinal bore (25) when the ball head (11) is preformed.

9. Process according to claim 4, characterized in that a longitudinal bore (25) passes through the ball head (11), to which bore a liquid or gaseous pressure medium is applied for the plastic deformation of the ball head (11) in order to radially displace the material of the ball head (11).

10. Process according to claim 8, characterized in that the longitudinal bore (25) passes through the ball head (11), into which bore a caulking mandrel (27) which radially displaces the material of the ball head (11) is inserted for the plastic deformation of the ball head (11).

11. Process according to claim 10, characterized in that the longitudinal bore (25) has an internal projection (26), which is radially displaced by the caulking mandrel (27).

12. Process for the production of a ball joint connection between a sliding shoe (10) and a cylinder piston (1) of a piston engine with the following process steps:

forming a spherical, dome-shaped recess (2) on the cylinder piston (1), or on the sliding shoe (10), and optionally forming the spherical, dome-shaped recess (2) both the cylinder piston (1) and the sliding show (10), wherein the dome-shaped recess (2) is undercut in such a way that the dome-shaped recess (2) comprises a solid angle region of more than 180° and a diameter (D) in a region of the equator plane (5) of the dome-shaped recess (2) is greater than an opening diameter (d) of the dome-shaped recess (2), forming a spherical ball head (11) on the sliding shoe (10), or on the cylinder piston (1), and optionally forming the spherical ball head (11) on both the sliding shoe (10) and the cylinder piston (1), and heating at least an edge region (6) surrounding the dome shaped recess (2) selectively cooling the ball head (11), inserting the ball head (11) into the dome-shaped recess (2), wherein an edge region (6) surrounding the dome-shaped recess (2) engages the ball head (11) after the insertion of the ball head (11), as soon as the temperatures of the ball head (11) and of the edge region (6) surrounding the dome shaped recess (2) have adjusted to each other.

13. Process for the production of a ball joint connection between a sliding shoe (10) and a cylinder piston (1) of a piston engine with the following process steps:

forming a spherical, dome-shaped recess piston (1), the sliding shoe (10), and optionally both, (2) on the cylinder wherein the recess (2) is undercut in such a way that the dome-shaped recess (2) comprises a solid angle region of more than 1800 and a diameter (D) in a region of the equator plane (5) is greater than a opening diameter (d) of the recess (2), forming a spherical ball head (11) on the sliding shoe (10), on the cylinder piston (1), and optionally both, and heating at least the edge region (6) surrounding the dome shaped recess (2) and/or cooling the ball head (11), inserting the ball head (11) into the dome-shaped recess (2), wherein an edge region (6) surrounding the dome-shaped recess (2) engages the ball head (11) after the insertion of the ball head (11), as soon as the temperatures of the ball head (11) and of the edge region (6) surrounding the dome shaped recess (2) have adjusted to each other.

* * * * *